(12) United States Patent
Miedema et al.

(10) Patent No.: US 11,579,950 B2
(45) Date of Patent: Feb. 14, 2023

(54) CONFIGURING AN API TO PROVIDE CUSTOMIZED ACCESS CONSTRAINTS

(71) Applicant: Ciena Corporation, Hanover, MD (US)

(72) Inventors: David Miedema, Ottawa (CA); Bruno Doyle, Ottawa (CA)

(73) Assignee: Ciena Corporation, Hanover, MD (US)

( * ) Notice: Subject to any disclaimer, the term of this patent is extended or adjusted under 35 U.S.C. 154(b) by 73 days.

(21) Appl. No.: 17/015,149

(22) Filed: Sep. 9, 2020

(65) Prior Publication Data

US 2022/0075674 A1 Mar. 10, 2022

(51) Int. Cl.
*G06F 3/00* (2006.01)
*G06F 9/54* (2006.01)
*G06F 40/205* (2020.01)
*G06F 16/955* (2019.01)

(52) U.S. Cl.
CPC ............ *G06F 9/547* (2013.01); *G06F 16/955* (2019.01); *G06F 40/205* (2020.01)

(58) Field of Classification Search
CPC ....................................................... G06F 9/541
USPC ....................................................... 719/328
See application file for complete search history.

(56) References Cited

U.S. PATENT DOCUMENTS

| | | | |
|---|---|---|---|
| 7,995,569 B2 | 8/2011 | Ashwood-Smith et al. | |
| 8,364,036 B2 | 1/2013 | Boertjes et al. | |
| 8,995,301 B1 * | 3/2015 | Miller | H04L 45/14 370/338 |
| 9,060,215 B2 | 6/2015 | Miedema | |
| 9,485,013 B2 | 11/2016 | Al Sayeed et al. | |
| 9,768,870 B2 | 9/2017 | Miedema et al. | |
| 10,257,596 B2 | 4/2019 | Swinkels et al. | |
| 10,680,739 B2 | 6/2020 | Swinkels et al. | |
| 10,834,141 B1 * | 11/2020 | Chud | H04L 63/107 |
| 2003/0135609 A1 * | 7/2003 | Carlson | H04L 67/1097 709/224 |

(Continued)

FOREIGN PATENT DOCUMENTS

| | | | | |
|---|---|---|---|---|
| AU | 2014304231 A1 * | 12/2015 | | G06F 8/60 |
| CN | 102812435 A * | 12/2012 | | G06F 11/3664 |

(Continued)

OTHER PUBLICATIONS

Hamza Ed-douibi, EMF-REST: Generation of RESTful APIs from Models. (Year: 2016).*

(Continued)

*Primary Examiner* — Lechi Truong
(74) *Attorney, Agent, or Firm* — Lawrence A. Baratta, Jr.

(57) ABSTRACT

A computing system includes a processing device and a memory device configured to store an Application Programming Interface (API) and computer software. The computer software has a plurality of software components configured to enable the processing device to utilize internal data for performing a plurality of functions. The API is configured to define interactions between the software components and is further configured to define access constraints with respect to the computing system. The access constraints are configured to restrict access by an end user associated with the computing system with respect to the internal data and software components. Also, the computer software is configured to adjust the access constraints of the API.

16 Claims, 5 Drawing Sheets

(56) References Cited

U.S. PATENT DOCUMENTS

| | | | |
|---|---|---|---|
| 2007/0043861 A1* | 2/2007 | Baron | H04L 67/10 709/224 |
| 2009/0182565 A1* | 7/2009 | Erickson | G06Q 10/063 705/300 |
| 2012/0221955 A1* | 8/2012 | Raleigh | H04W 4/24 726/1 |
| 2014/0359261 A1* | 12/2014 | Collins | G06F 8/60 713/1 |
| 2015/0026165 A1* | 1/2015 | Louie | G06F 16/335 707/723 |
| 2015/0229528 A1 | 8/2015 | Swinkels et al. | |
| 2015/0324386 A1* | 11/2015 | Calder | G06F 16/955 707/649 |
| 2016/0057107 A1* | 2/2016 | Call | H04L 63/0236 726/11 |
| 2016/0182355 A1 | 6/2016 | Traxler et al. | |
| 2016/0191519 A1* | 6/2016 | Surendrakumar | H04L 63/105 726/7 |
| 2016/0218948 A1 | 7/2016 | Djukic et al. | |
| 2017/0201850 A1* | 7/2017 | Raleigh | H04W 4/50 |
| 2018/0084063 A1 | 3/2018 | Miedema | |
| 2019/0012254 A1* | 1/2019 | Gupta | G06F 11/0766 |
| 2019/0174211 A1 | 6/2019 | Swinkels et al. | |
| 2019/0220331 A1* | 7/2019 | Duggal | G06F 9/5072 |
| 2019/0349262 A1 | 11/2019 | Miedema et al. | |
| 2020/0228499 A1* | 7/2020 | Rajagopalan | G06F 21/6209 |
| 2021/0182131 A1* | 6/2021 | Reuzel | G06F 9/547 |
| 2021/0232446 A1* | 7/2021 | MorAES | G06F 9/542 |

FOREIGN PATENT DOCUMENTS

| | | | | |
|---|---|---|---|---|
| CN | 104598257 A | * | 5/2015 | G06F 9/4843 |
| CN | 105138454 A | * | 12/2015 | |
| KR | 101653685 B1 | * | 9/2016 | |
| WO | WO-0072119 A2 | * | 11/2000 | G06F 21/10 |
| WO | WO-2017061901 A1 | * | 4/2017 | G06F 16/00 |

OTHER PUBLICATIONS

Sebastian, Access Control on RDF Triple Stores from a Semantik Wiki Perspective. (Year: 2006).*

Matt Massie, ADAM: Genomics Formats and Processing Patterns for Cloud Scale Computing. (Year: 2013).*

* cited by examiner

US 11,579,950 B2

CONFIGURING AN API TO PROVIDE CUSTOMIZED ACCESS CONSTRAINTS

TECHNICAL FIELD

The present disclosure generally relates to software systems and methods. More particularly, the present disclosure relates to processes for configuring Application Programming Interfaces (APIs) of a distributed service software architecture to include customizable access constraints.

BACKGROUND

Generally, an Application Programming Interface (API) is used in a software architecture to define the interactions between a number of software procedures, subroutines, code, etc. Also, APIs can define how a user may interact with the software, how requests are made, what formats or protocols are used, among other functions. Also, many current software applications are deployed in a distributed software architecture where any number of users may access portions of the software from any number of locations using different types of devices. APIs in these distributed systems are typically fixed with respect to how users can access various portions of the software.

Many independent software components may be combined together to perform a set of functions. Specifically, the functions that are performed may be referred to as services, where parts of a function may be referred to as microservices. In a grouping of such services, which may be referred to as a "deployment," many services may represent data that is for internal use only. In order to hide this internal data from an external user, a "northbound" service may be written to act as a gateway for a user. Only the selected external resources are supported by this gateway, which can provide a mechanism to hide data and notifications of the internal services from the user.

One drawback of this approach is that it requires a custom design of a service that creates one external view of the system. Any time the internal services change, the external resources need to be updated and a new API needs to be generated. Since an API is traditionally defined statically or inflexibly, it can only be presented as one pre-defined view to the outside world. As such, many conventional methods for defining APIs will focus on a static, monolithic definition for filtering, which may simply be a factor of a single feature of a user access level. Therefore, there is a need for software applications with APIs to provide more flexible or customizable API features to allow a variety of access constraints.

BRIEF SUMMARY

The present disclosure focuses on software that may be used in a service or microservice architecture for providing various functions or services for end users. The software may be configured with various components for performing the functions utilizing internal data. The software may include an Application Programming Interface (API) that may be developed to include a set of access constraints. The access constraints are configured to limit the access that an end user is allowed to have for viewing internal data and software components. As opposed to narrowly defining the API such that it has a fixed set of access constraints, as is the case with conventional APIs, the various embodiments of the present disclosure are configured such that the access constraints of the API can be customized as needed based on a variety of different factors at a number of different levels of operation.

According to one embodiment of the present disclosure, a computing system may be configured to include a processing device and a memory device, where the memory device is configured to store an API and computer software having a plurality of software components configured to enable the processing device to utilize internal data for performing a plurality of functions. The API is configured to define interactions between the software components and is further configured to define access constraints with respect to the computing system. The access constraints are configured to restrict access by an end user associated with the computing system with respect to the internal data and software components. Also, the computer software is configured to adjust the access constraints of the API.

According to another embodiment of the present disclosure, a non-transitory computer-readable medium is configured to store computer software having a plurality of software components. The computer software, when executed, is configured to enable a processing device to utilize internal data for performing a plurality of functions. Also, the computer software is configured to enable the processing device to create an API for defining interactions between the software components and the internal data. The processing device is further enabled to develop access constraints of the API for restricting access by an end user to the software components and internal data. Also, the processing device is configured to adjust the access constraints of the API, such as by an orchestrator or network operator.

According to yet another embodiment, a method includes the step of creating an API for defining interactions between software components and internal data. The method also includes the step of developing access constraints of the API for restricting access by an end user to the software components and internal data. The method is configured such that adjustments of the access constraints of the API are enabled.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

The present disclosure relates to software systems and methods in which an Application Programming Interface (API) may be customized according to a number of different factors for allowing access to different parts of a software application. In some embodiments of the present disclosure, the APIs may be dynamically configured or customized within software applications (e.g., service software providing multiple microservices).

Customization System

Figure 1:
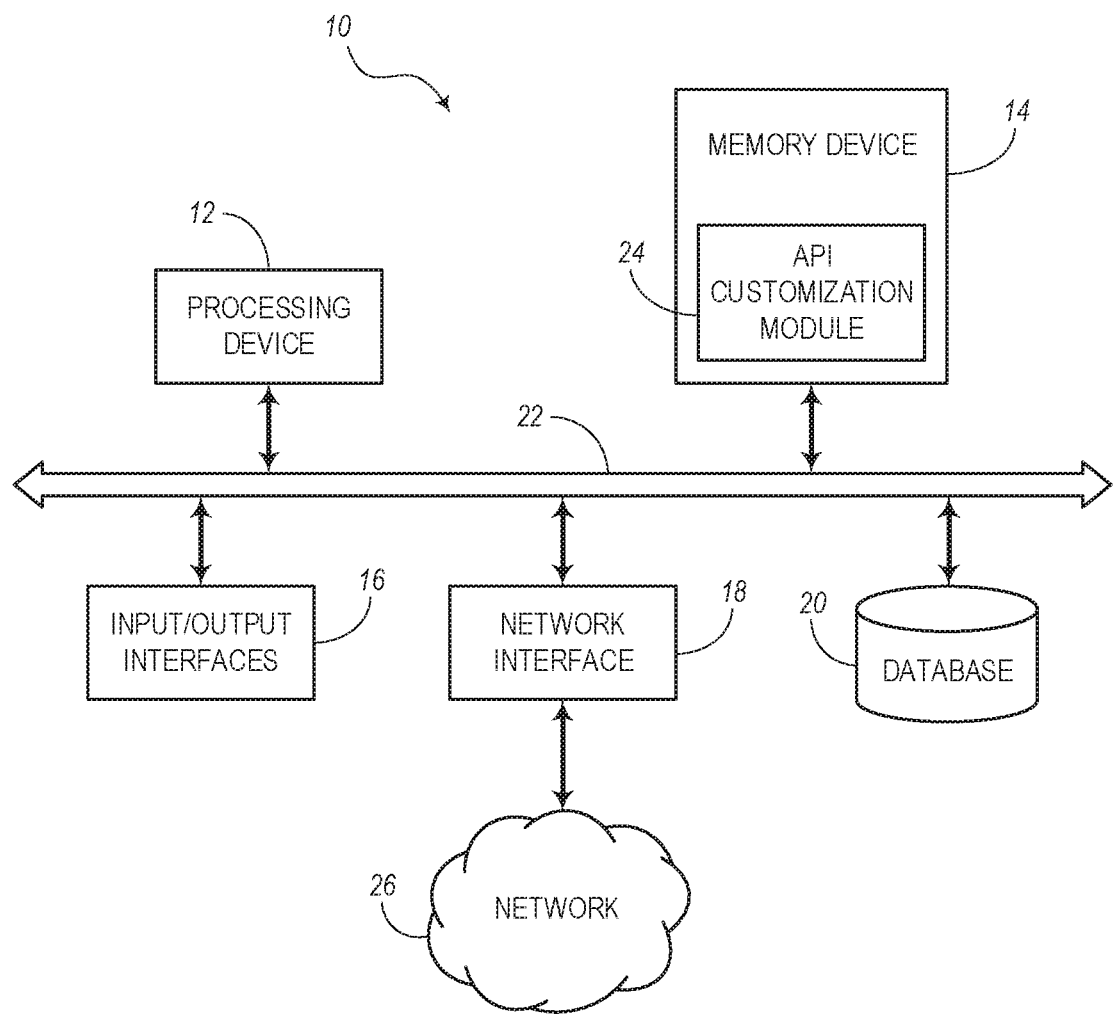
FIG. 1 is a block diagram illustrating a computing system for customizing Application Programming Interfaces (APIs) in software operating within a network, according to various embodiments of the present disclosure.

FIG. 1 is a block diagram illustrating an embodiment of a computing system 10 for customizing APIs in software operating within a network. According to various embodiments, the computing system 10 may be used by a software developer and/or may represent one of several devices used by a team of software developers working together to develop or create a software program. According to other embodiments, the computing system 10 may be used by a software deployment manager for deploying the developed software throughout a network and/or may represent one of several devices used by a team of software deployment managers working together to deploy the software program. According to other embodiments, the computing system 10 may be used by an orchestrator for customizing APIs of the software program for restricting access to the portions of the software program as used throughout the network and/or may represent one of several devices used by a team of orchestrators working together to customize the APIs.

In the illustrated embodiment, the computing system 10 may be a digital computer that, in terms of hardware architecture, generally includes a processing device 12, a memory device 14, Input/Output (I/O) interfaces 16, a network interface 18, and a database 20. The memory device 14 may include a data store, database (e.g., database 20), or the like. It should be appreciated by those of ordinary skill in the art that FIG. 1 depicts the computing system 10 in a simplified manner, where practical embodiments may include additional components and suitably configured processing logic to support known or conventional operating features that are not described in detail herein. The components (i.e., 12, 14, 16, 18, 20) are communicatively coupled via a local interface 22. The local interface 22 may be, for example, but not limited to, one or more buses or other wired or wireless connections. The local interface 22 may have additional elements, which are omitted for simplicity, such as controllers, buffers, caches, drivers, repeaters, receivers, among other elements, to enable communications. Further, the local interface 22 may include address, control, and/or data connections to enable appropriate communications among the components 12, 14, 16, 18, 20.

The processing device 12 is a hardware device adapted for at least executing software instructions. The processing device 12 may be any custom made or commercially available processor, a Central Processing Unit (CPU), an auxiliary processor among several processors associated with the computing system 10, a semiconductor-based microprocessor (in the form of a microchip or chip set), or generally any device for executing software instructions. When the computing system 10 is in operation, the processing device 12 may be configured to execute software stored within the memory device 14, to communicate data to and from the memory device 14, and to generally control operations of the computing system 10 pursuant to the software instructions.

It will be appreciated that some embodiments of the processing device 12 described herein may include one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), and the like). The processing device 12 may also include unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry" or "logic" that is "configured to" or "adapted to" perform a set of operations, steps, methods, processes, algorithms, functions, techniques, etc., on digital and/or analog signals as described herein for the various embodiments.

The I/O interfaces 16 may be used to receive user input from and/or for providing system output to one or more devices or components. User input may be provided via, for example, a keyboard, touchpad, a mouse, and/or other input receiving devices. The system output may be provided via a display device, monitor, Graphical User Interface (GUI), a printer, and/or other user output devices. I/O interfaces 16 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an Infra-Red (IR) interface, a Radio Frequency (RF) interface, and a Universal Serial Bus (USB) interface.

The network interface 18 may be used to enable the computing system 10 to communicate over a network, such as the network 26, the Internet, a Wide Area Network (WAN), a Local Area Network (LAN), and the like. The network interface 18 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The network interface 18 may include address, control, and/or data connections to enable appropriate communications on the network_.

The memory device 14 may include volatile memory elements (e.g., Random Access Memory (RAM)), such as Dynamic RAM (DRAM), Synchronous DRAM (SDRAM), Static RAM (SRAM), and the like, nonvolatile memory elements (e.g., Read Only Memory (ROM), hard drive, tape, Compact Disc ROM (CD-ROM), and the like), and combinations thereof. Moreover, the memory device 14 may incorporate electronic, magnetic, optical, and/or other types of storage media. The memory device 14 may have a distributed architecture, where various components are situated remotely from one another, but can be accessed by the processing device 12. The software in memory device 14 may include one or more software programs, each of which may include an ordered listing of executable instructions for implementing logical functions. The software in the memory device 14 may also include a suitable Operating System (O/S) and one or more computer programs. The O/S essentially controls the execution of other computer programs, and provides scheduling, input-output control, file and data management, memory management, and communication control and related services. The computer programs may be configured to implement the various processes, algorithms, methods, techniques, etc. described herein.

The memory device 14 may include a data store used to store data. In one example, the data store may be located internal to the computing system 10 and may include, for example, an internal hard drive connected to the local interface 22 in the computing system 10. Additionally, in another embodiment, the data store may be located external to the computing system 10 and may include, for example, an external hard drive connected to the Input/Output (I/O) interfaces 16 (e.g., SCSI or USB connection). In a further embodiment, the data store may be connected to the computing system 10 through a network and may include, for example, a network attached file server.

Moreover, some embodiments may include a non-transitory computer-readable storage medium having computer readable code stored in the memory device 14 for programming the computing system 10 or other processor-equipped computer, server, appliance, device, circuit, etc., to perform functions as described herein. Examples of such non-transitory computer-readable storage mediums include, but are not limited to, a hard disk, an optical storage device, a magnetic storage device, a Read Only Memory (ROM), a Programmable ROM (PROM), an Erasable PROM (EPROM), and Electrically Erasable PROM (EEPROM), Flash memory, and the like. When stored in the non-transitory computer-readable medium, software can include instructions executable by the processing device 12 that, in response to such execution, cause the processing device 12 to perform a set of operations, steps, methods, processes, algorithms, functions, techniques, etc. as described herein for the various embodiments.

The computing system 10 may be configured to develop and deploy software for use in a distributed system by multiple users. Also, the computing system 10 may further include an API customization module 24, which may be implemented in hardware, software, firmware, or any combination thereof. As shown in FIG. 1, the API customization module 24 may be implemented in software and stored in the memory device 14. The API customization module 24 may include computer logic, instructions, etc., configured to enable the processing device 12 to perform various functions related to customizing one or more APIs in a software deployment. The software may be part of a service or microservice that is provided to one or more users of the software, where access to portions of the software may be restricted or constrained based on the processes described in the present disclosure.

Figure 2:
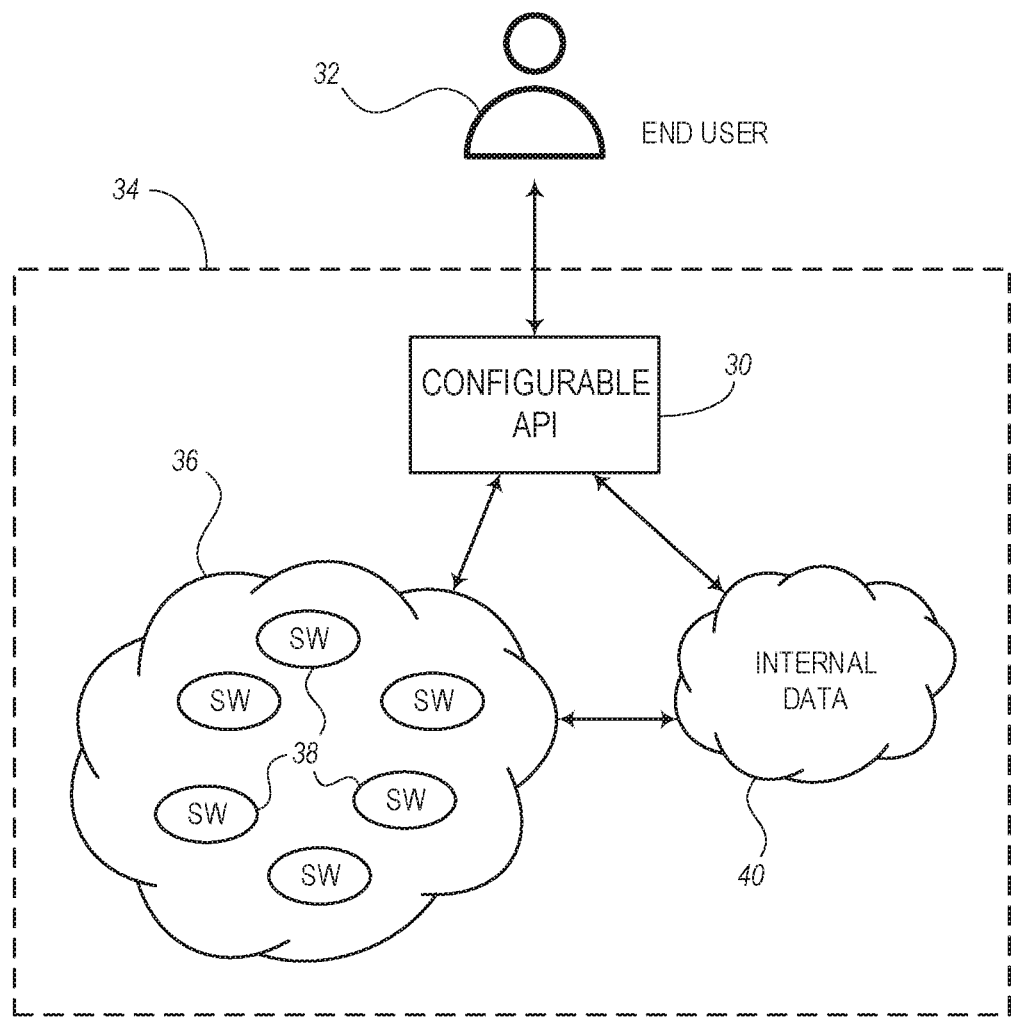
FIG. 2 is a diagram illustrating the function of an API as a filter between a user and a software deployment, according to various embodiments.

FIG. 2 is a diagram showing an example of how an API 30 may function as a filter between a user 32 and a software deployment 34. The software deployment 34 may be distributed throughout a network (e.g., network 26) to allow the software to run on multiple devices to perform various functions or services for a number of users. Based on the access level of different users and other factors, the API 30 can limit how much a user can view of the software.

The software deployment 34 may include services 36 including a plurality of interrelated software components 38 (e.g., code, subroutines, logic, procedures, etc.). The software deployment 34 also includes internal data 40 that may be used by the software components 38 as needed to perform various functions or services. In some embodiments, the internal data 40 may be stored in a database (e.g., database 20), memory, or other suitable storage system. The API 30 acts as a gateway between the user 32 and the software deployment 34 to establish a filter that defines what the user 32 may access. Thus, the API 30 provides constraints or restrictions on the user 32 regarding what portions of the software deployment the user 32 can view.

Method to Configure API for Constraining Access

Many independent software components 38 may work together to perform a set of functions in the distributed service architecture. In the software deployment 34, many services may be represented by the internal data 40, which may be configured for internal use only. In order to hide this internal data 40 from an external user 32, the API 30 may represent a "northbound" service acting as a gateway for the user 32. Only selected external resources are supported by this gateway, whereby the API 30 is implemented as a mechanism to hide the internal services 36 and internal data 40 (e.g., information, notifications, etc.) from the user 32.

Compared to conventional systems, an advantage of the API 30 (as defined in this embodiment and throughout the present disclosure) is that the API 30 is customizable. Thus, the API 30 can have a custom design of the services 36 that is configured to provide more than just one external view of the system. Any time the internal services 36 change and the external resources need to be updated, a new API needs to be generated to replace the API 30. This simplifies the updating and deployment of software services.

Instead of statically defining only one view of the API to the outside world (as is done by conventional systems), the embodiments of the present disclosure can provide a view that can be changed based on any number of factors, such as the authorization level of a user, licenses that have been obtained by the user for using the software, each user in one or more access groups, among other constraints or restrictions. Therefore, the API 30 can be dynamic and customizable to enact different restrictions for different users, different user-operated computing systems, different operational modes or use cases, etc. It may also be advantageous to have APIs restricted based on authorization level. A user in a given access group may be prohibited from certain APIs or portions of an API.

In many cases, a given deployment can be constructed that can operate differently in given operational modes. It may be advantageous to have a portion of the API disabled based on a role of the user's computing system in the network. If users do not pay for licensed features, the API may be configured to block them in this case. If there are multiple standards-based APIs that do similar functions and a user wants to be able to select one over another, the API 30 may be dynamically configurable.

The present disclosure may allow an orchestrator, such as a user or operator of the computing system 10 of FIG. 1, to specifically customize the APIs for any clients (e.g., end users or groups of end users) in any variety of ways. In this way, the orchestrator, using the API customization module 24, may enable a process in which the APIs can be selectively edited and/or configured with respect to any device running in the network. The different aspects of control that may be customized include: a) allowing control of the "mode" of a user's computing system, b) allowing control of the APIs available to a given user or user class, c) allowing control of the APIs available based on purchased or licensed content, d) allowing selection of preferred APIs for a task when multiple options exist, e) allowing a client to selectively constrain an API for efficiency based on a dynamic input parameter, f) allowing a client to easily constrain the data returned or accepted by an API for a given use case, g) allowing the service to have control over what parts of an API are exposed based on the deployment it is deployed into, etc.

API Access

A fundamental part of the present disclosure is the way that "access" to an API may be described. This access may be described in terms of data that can be modified and queried and may be defined in some sort of schema. A schema is a model written in a machine parsable language that describes data nodes for Create, Read, Update, and Delete (CRUD) operations, methods, Remote Procedure Calls (RPCs), actions, and notifications that can be emitted. A schema normally gets to the level of leaves or fields and can be flat or hierarchical. APIs can be written in many ways and are not limited to MIB, OpenAPI (REST interfaces), XML, JSON, and YANG. In order to describe API access, another way is needed to describe portions of an API in data, where this data is representable as a configurable element in that schema.

A rough version of an access description could simply be a list of URLs that are supported, such as:
ip/api/restart
ip/api/force-out
ip/api/status However, many APIs may be complex. Not only is a base level API described in the present disclosure, but also what parameters can be reported or supplied for configuration, operational data, RPCs, notifications, and/or telemetry.

By considering the "status" API above (i.e., ip/api/status) and considering the fact that it may contain certain elements of data that can have different access requirements, the API may be described as:
ip/api/status
  Input
    users
    uptime
    events
    telemetry
  Output
    users
      logged-in
      blocked
      super-user
    uptime
      current-time
      since-power-on
      since-reboot
    events
      intrusion-attempts
      restart-complete
      connections
      restarts
    telemetry
      temperature
      fan-speed
      power-draw And an access control specification for a limited user may be
ip/api/status
  Input
    uptime
    events
    telemetry
  Output
    uptime
      current-time
    events
      restart-complete
    telemetry
      temperature There are a variety of ways to describe the access control and some will be quite detailed. Features of efficient access control specifications are described below.

Efficient Access Control Modeling

The APIs may be configured such that they provide a filtering effect with respect to what parts of the software can be accessed by different users. The filters may include features of access control specifications. For example, a filter may be configured such that it can be constructed by merging multiple filters together. Since some APIs may be quite large, it may be difficult to model an entire access list to maintain the list as one element. Instead, it may be more efficient to have each service describe itself and then merge these descriptions into one combined description.

Also, a filter may be configured such that it can be based on another existing filter. In this way, it can inherit access constraints from an existing class to simplify refinements. Also, a filter may be configured such that it can be constructed by excluding content from another filter. For example, in some cases, it may be easier to describe what is not supported than what is supported.

Filters of the APIs may also be defined whereby a base description could be selectable. For example, if a device has multiple modes of operation that it can support, the present systems may be configured to select a mode and change a base access group. Also, subsequent filters derived from this base group may not be able to extend beyond what the base group supports. In addition, separate filters can be supported for the types of actions that are supported by the APIs, which may include: a) edit, b) query, c) execute, d) notify/stream, etc.

Figure 3:
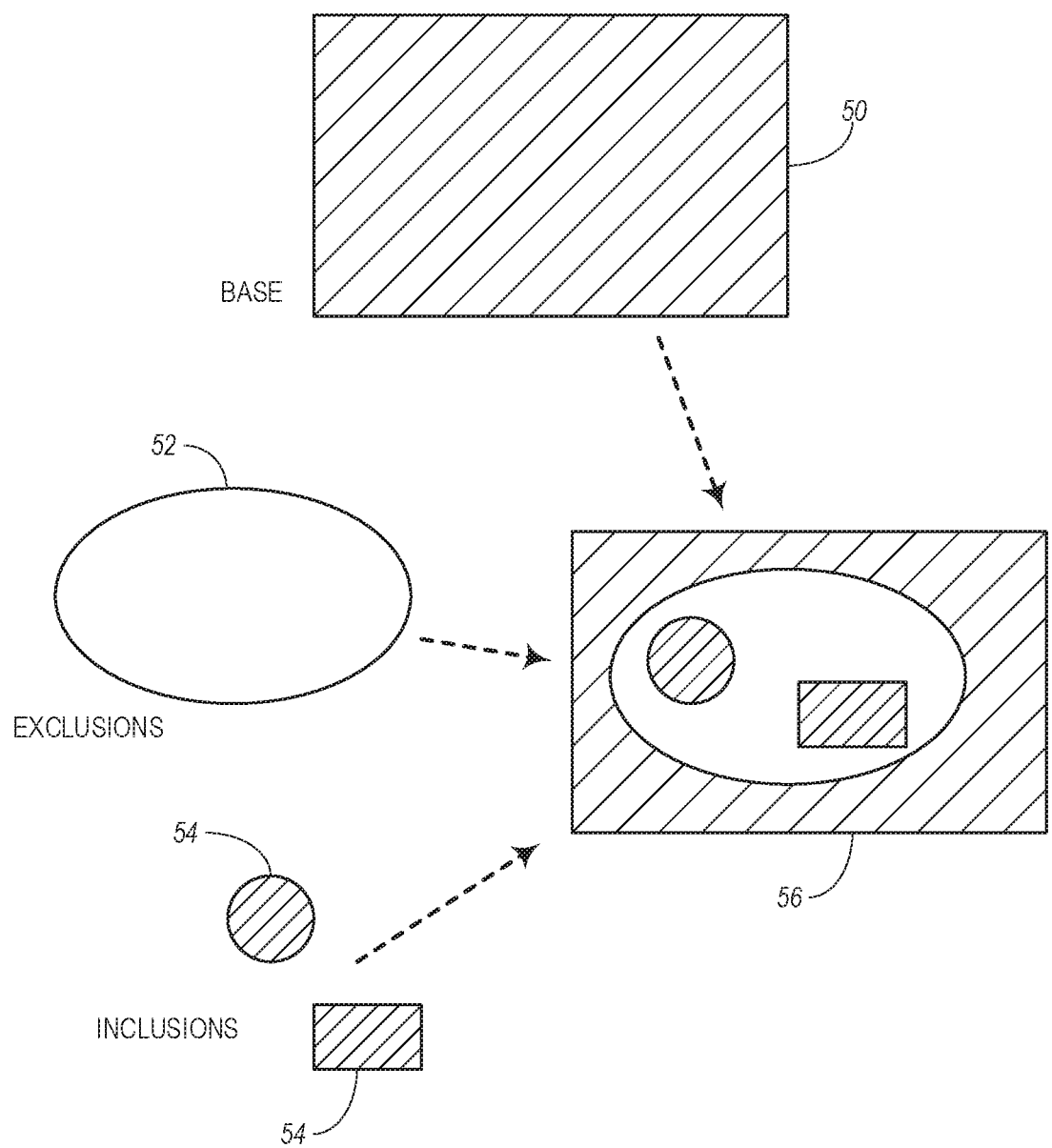
FIG. 3 is a diagram illustrating the construction of an access control filter by combining exclusions and inclusions, according to various embodiments.

FIG. 3 is a diagram illustrating an embodiment of a process for the construction and specification of an access control filter by combining exclusions and inclusions. The process may include taking a base filter 50, which may have a first set of defined boundaries or restrictions. Then, one or more exclusions 52 can be applied to the base filter 50 to remove (exclude) some portions of the first set of restrictions. Also, one or more inclusions 54 can be applied to the base filter 50 to add (include) some additional restrictions. The resulting filter 56 can be defined as the base filter 50 minus the one or more exclusions 52 plus the one or more inclusions 54. This resulting filter 56 can then be used as a base filter for other filters to be defined.

A top-level filter (e.g., base filter 50) may be supported by defining the absolute constraints of all filters that may be derived from it. Services interested in performing tests against this filter can use the combined result to test if any data in a request or action violates constraints and what error should be reported. These constraints may include: a) user access control, b) system level support, c) system mode constraints, d) licensing constraints, etc. The filters as specified can list the APIs with the fields that are included or excluded or can refer to another defined filter with content that describes exclusions or inclusions.

Using Access Groups Internally

Once combined filters are computed, any resource in the system can determine the access level described by the computed filter. This can be used to: a) constrain help text, b) constrain computed API metadata (e.g., network configuration capabilities, HATEOAS descriptions, etc.), c) report an error on edit or execute access violations, d) silently trim content in a get-response or notification, e) limit the available APIs based on server port, etc.

Constraining an API

Once there is a method to describe and manage filters, there are a variety of ways this can be used to constrain and customize an API. On a user access level, for example, once a user has been authenticated and the access level is known, the access level can be used to refer to a filter that can be applied. These filters may be applied to all sessions for this user of the service:

Super Level
    ip/api/status
        Input (users, uptime, events, telemetry)
        Output (users (logged-in, blocked, super-user), uptime (current-time, since-power-on, since-reboot), events (intrusion-attempts, restart-complete, connections, restarts), telemetry (temperature, fan-speed, power-draw)
    Limited Level
    ip/api/status
        Input (uptime, events, telemetry)
        Output (uptime (current-time), events (restart-complete), telemetry (temperature))

In a service mode for customizing an API, if multiple bases or filters are supplied for a service, provisioning or operational data against that service can select a mode (to operate in) that changes the filters used by all users in the system:

Standard A
    ip/api/equipment
        part-number
        serial-number
        operational-state
        date
    ip/api/restart
    ip/api/get-power-draw
    Standard B
    ip/api/components
        Orderable-part-code
        Serial-no
        Status
        Manufacturing week
        Manufacturing year
        Parent component
        Subcomponents[ ]
        Power draw
        Restart Session/Workflow Based Once a user has logged in, a new filter can be temporarily created for this user based on the service API and the user permissions to further constrain the APIs used by default. For example, if a user logs into an API and has many APIs available to it, but in the context of the workflow only wants limited data available in actions and queries, a temporary filter can be applied to the session to constrain the APIs for efficiency or safety:

Service Provisioning Workflow
    ip/api/cross-connections
    ip/api/topology
    ip/api/defects
    Equipment Provisioning Workflow
    ip/api/equipment
    ip/api/topology
    ip/api/chassis
    Troubleshooting Workflow
    ip/api/defects
    ip/api/get-logs Invocation/Transaction Based If there is a set of common actions that can be done by every user, it may be useful to construct a filter that is overlaid on existing APIs. For example, if an API to get all data (config and operational) is constrained by an "optical power" filter, then, in a single invocation, a filter can be supplied that efficiently limits the requested data to only fields related to optical power:

Optical Power Monitoring
    ip/api/ports
        Output (port (tx-power, rx-power, error-counts), amplifier (input-power, output-power, gain))

Service Constrained/Deviation

If an API supported by a service is based on a third-party specification, but the service does not fully support all modes of that API, the service can constrain itself to indicate which portions of the API are not supported:

Standard X
    Wi-Fi
    Ethernet
    Generalized Multi-Protocol Label Switching (GMPLS)
    Border Gateway Protocol (BGP)
    Open Shortest Path First (OSPF)
    Intermediate System to Intermediate System (ISIS)
    Transport
    Equipment
    Alarms
    Security
    IPv4
    IPv6
    Dynamic Host Configuration Protocol (DHCP)
    Service X
    Include:
        Ethernet
        OSPF
        Transport (e.g., optical amplifiers)
        Equipment (e.g., chassis, cards)
        Alarms (show)
        IPv4
        DHCP (IPv4)
    Exclude:
        Wi-Fi
        GMPLS
        BGP
        Transport (e.g., transponders, VOAs)
        Equipment (e.g., fans, power)
        Alarms (clear)
        Security
        IPv6
        DHCP (IPv6)

License Based

Editing licensing content on a device can automatically and dynamically change the APIs exposed to the end user. This can be used to hide protected content of an API that may be valuable in and of itself even if the API cannot be invoked. Prior to licensed content being enabled, the help text or schema descriptions provided to a more limited user would be able to hide that protected content Runtime Changes to Data Ownership Some deployments may exist in which there are multiple APIs that can control the same elements. This can be due to multiple standard APIs that need to be implemented by the device to address different customer requirements, but which all do the same or similar things in different ways. One example in networking devices may include the implementation of a standard OpenConfig API. The device can then be managed by OpenConfig, a Native model, or both at the same time. However, it is sometimes useful to make it clear which API is to be used for the configuration of an element.

Furthermore, this situation can change dynamically or even on a per-element basis. Some elements in the system may be controlled by one interface, and other elements in the same system can be controlled by the other interface. This behavior and selection of an API for data ownership can change the flow of the services managing a resource at runtime, and the unselected interface can be disabled while the selected interface can be enabled at the same time while running.

Service API Catalogs

A given service may support different levels of API based on a "view" of the API. For example, a "standard" view, a "limited" view, or a "diagnostics" view of a service may be described by a service as a shorthand for the elements of an API that be selected by a user or deployment orchestrator. The views provided by one service do not need to be consistent across multiple services as an orchestrator can select from each service's catalog and combine constrained APIs in different ways.

One service may describe an internal view as a "diagnostic" view, and another can describe the internal view as "internal" or "power-user." An orchestrator for the deployment can easily select from these views when it constructs the user, deployment, or session-based filters. An advantage of having the service define its own filters in a catalog is that the top level orchestrator does not need to make decisions for every service, it just needs to select from a set of predefined filters that closely match the desired external APIs. Changes to these catalog entries by the service can be dynamic during assembly stage or at runtime without changing the code in the orchestrator.

Methods to Combine Constraints

Constraints can be defined at the levels of:
Service
System
Deployment
Resource
User
Session
Workflow Also, constraints can be modified at runtime via configuration. As a result, a method may be created to be able to combine filters together based on these definitions and arrive at a combined filter for every invocation.

Figure 4:
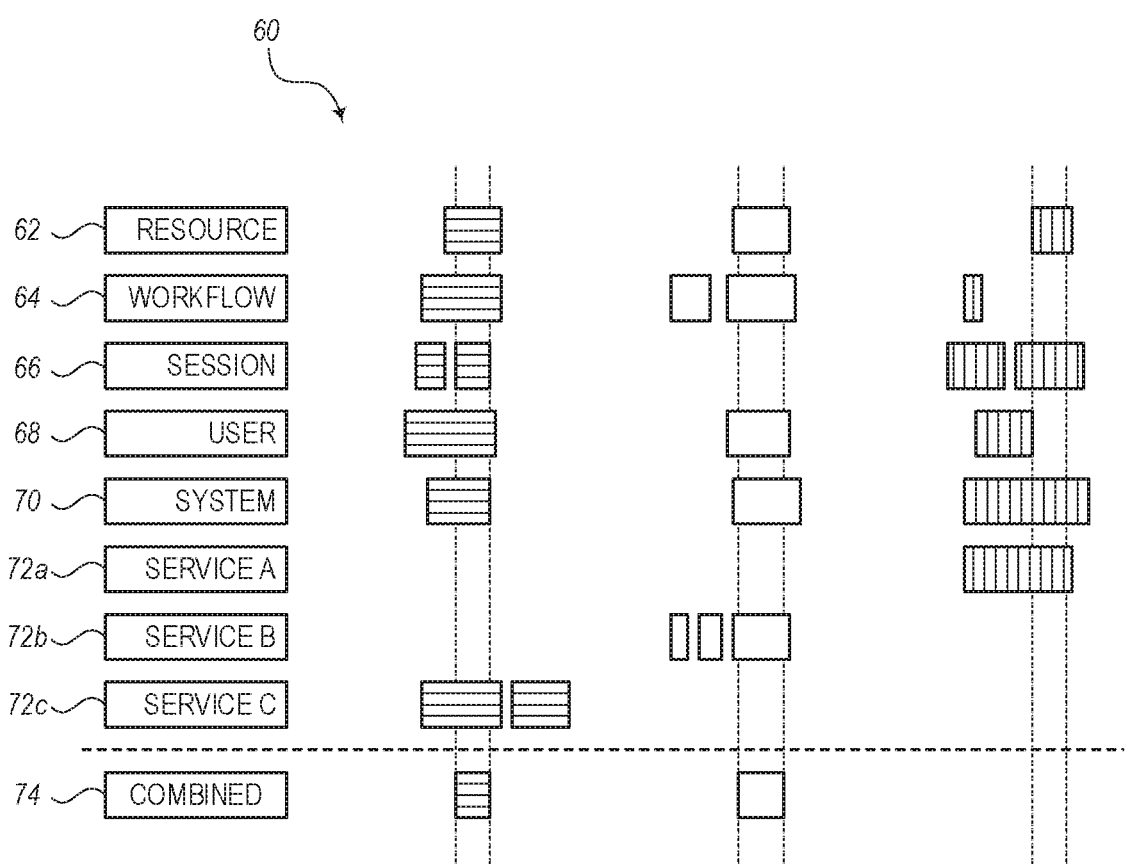
FIG. 4 is a diagram illustrating a process for combining constraints on multiple levels, according to various embodiments.

FIG. 4 is a diagram illustrating an embodiment of a process 60 for combining constraints on multiple levels. The process 60 includes constraints on different level, such as the level designated as resource 62, workflow 64, session 66, user 68, system 70 (or deployment), and services 72a, 72b, 72c. When combined, the process 60 is able to produce a combined filter 74.

The method described with respect to "Efficient Access Control Modeling" may be used in the process 60 to easily allow access groups at any level and configuration to be merged together in terms of inclusion, exclusion, and base constraints. Starting from the level of the services 72a, 72b, 72c (e.g., in one of multiple service views), the process 60 is able to combine into a level representing the system 70 (or deployment), constrained or expanded by the user 68 on one level, in the session 66, with a contextual workflow 64 for a specified resource 62. A superset filter can be obtained and then constrained by the underlying base that represents the static supported view to obtain the combined filter 74 on the level for the constraint/restriction set. The combined filter can then be made available at any level and this framework can support the use of the combined filter to constrain APIs, inputs, and/or outputs.

Examples

The software, as described in the present disclosure, may be deployed in a network, such as an optical communication network or any suitable network or system. The software may be deployed in a distributed fashion to enable multiple users to utilize the software. In many embodiments, the software may be configured as a service, such as a Software as a Service (SaaS) implementation, for providing data communication services on an optical network. The services may further be defined as multiple microservices, each microservice configured to perform one or more actions or functions. Also, the microservices may provide any suitable type of function or procedure. The microservices may be defined as small portions of code or subroutines of the software. The software may be stored on a computing system itself and is not necessarily microservice-based.

In conventional software products, multiple developers might combine their code into one library system that would run on shared memory. The software might have shared objects distributed throughout a system. However, in this case, it may be difficult to start decoupling software at that point. Thus, since it may be easier to have enforced boundaries so that the objects can be decoupled, one of the goals of microservices as described in the present disclosure to overcome some shortcoming of conventional systems is to move the code to a message-based interface that is location independent with respect to where the software is running.

Messaging layers and the APIs enforce the boundaries of those microservices. The code does not run on its own process base or address base, so it may not be possible to share information without going through the messaging layer. As a result, there may be an impact on performance, but generally it is only trying to get some operational boundaries so that the operations can run independently of each other. In some embodiments, it may be possible to move the operations around and put them in different deployments, which is part of the software development process.

The embodiments of the present disclosure may be compared with conventional access control. With conventional implementations (which might not be microservice-based), the systems are only concerned about the "northbound" interface, which is the interface that is exposed to the end user. It should be noted, however, that any communication among software components may be considered to be an interface and therefore there is nothing particularly special about the northbound interface, except that it is what is exposed to a customer or end user. With microservices, however, any interaction may be considered as an east-to-west type of interaction. For example, in conventional software development, a single set of code might have one northbound interface, which would be managed manually. With microservices, every interface may have its own API, which would be documented and exposed to a user, which is fairly inflexible from a development perspective.

The embodiments of the present disclosure address the issue of combining bunches of microservices having internal APIs, debugging APIs, and APIs that should be kept secret from users. Particularly, the present embodiments are configured to provide flexible constraints in order to only expose the parts of the software program that are intended to be shared with the user. Internally, a software program may have dozens of microservices running with their own APIs, but an orchestrator may want to control the software such that most end users are not able to access any of them on their own APIs. Thus, the orchestrator can strategically constrain what a user is allowed to do.

Normally, with conventional software architectures, there may be the one northbound service, which may also be known as a proxy or gatekeeper. However, it may expose custom APIs to the end user that should not be exposed. Then, it is the job of the end user to act as a proxy. This may be a first way that the API can be constrained from an end user. However, this may be a static way of developing the constraint, because the service has to be managed specially to export just the APIs that are intended to be visible to the customer. Once the API is exposed, there may be some control mechanisms that the protocol supports. The service may export a superset of what is intended to be exposed and then access control methods can be run to allow the orchestrator to trim that list down. This can be done on a per-class basis or a per-user basis. For example, the access constraints of the API can be developed such that a user is limited in such a way that he or she only has access to certain APIs. Another set of access constraints may be developed for another end user who may only be able access via a read-only procedure and is not allowed to do any write procedures. In another situation, a "diagnostics" user may have another set of access constraints to allow him or her to perform certain diagnostics procedures. In this case, the diagnostics user may be given access to material that is not normally given to most user. The API customization module 24 allows the orchestrator or network operator to customize the APIs accordingly. These processes may be referred to as "access control management."

If every service not only allows itself to have an external client change what is accessible on an API, but also allows itself to have run time implications that the deployment can constrain, then it may be understood that the embodiments of the present disclosure are able to provide filters at many different layers and have a mechanism to roll all those filters together into one external access control group that is visible to an external user. Each one of those services may be limited or restricted based on a particular user, what interface the user is using, what deployment is being run, what operations the user is trying to do, what kind of workflow the user is using, and what is allowed by each user or class of users.

Therefore, the present disclosure describes embodiments that take the idea of access control and give the power to the services themselves to constrain what can be done by certain users on certain interface under certain conditions or deployments. It also gives power to a deployment orchestrator by allowing the orchestrator to develop the access constraints of the API such that when the software is deployed, it will have the restrictions that may be set up for an initial implementation, but can also be adjusted as needed to change the constraints based on changes to a network or other circumstances. As an example, if optical software is deployed for a submarine network, the orchestrator may establish the access constraints accordingly for limited availability. On a metro network, however, the access constraints may be established with different settings to enable access or availability to other portions of the internal data or software components of which the API acts as a gatekeeper. In some cases, an orchestrator may be aware of specific users that may be able to gain access and can thus tailor the API accordingly. Adjustments can be made depending on other factors, such as an intended or actual workflow, whereby certain restrictions may be needed for the specific workflow characteristics.

For any service or software that is constrained, the API can be configured such that it can provide certain constraints. Not only this, but an orchestrator can further constrain that service as well depending on various operating conditions or other factors. Therefore, the API is not just developed by an end user, but can have additional limitations that can be adjusted as needed.

There are many different layers of constraints that can be applied. The present disclosure includes systems and methods for providing a mechanism by which access constraints are not just on one layer, but can include a combination of restrictions on different layers combined together. For example, the various combinations may be viewed in a Venn diagram where the constraints include the common limitations of a number of different factors for allowing access. The creation of this combination may include the use of "filters" where an orchestrator or operator can include or exclude different elements of an API depending on a particular situation. For example, an operator can manipulate the API to change the access level capabilities and/or may define access privileges to adapt to certain situations.

In addition, the API can be manipulated in other ways as well. For instance, an operator may have access software running, but may need to deploy it in a submarine environment. In this case, the operator can divide the API into pieces and can then fine-tune that API to allow some data or software to be visible while other data or software is not visible. The operator can then customize the API piece for, say, a submarine deployment and may wish to restrict access on a per-user basis.

The operator may also set up the API to constrain access based on information associated with a licensing agreement. If optical submarine software is licensed, certain features may be enabled based on the licensing for this deployment. The embodiments of the present disclosure may provide a means for mechanism that allows the user to open the API up so that the help text and other documentation is visible. This may include CLI tab completion, which may change dynamically based on the context in which the software is operating.

In addition to licensing, deployment management is another situation where the access constraints of the API may be adjusted. The services themselves can be constrained based on what devices the clients are using for connecting to a server and/or how the software is deployed. On top of that, managers can provide additional constraints for their end users. In this respect, there can be constraints at practically every level.

Regarding user-added or manager-added constraints, a customer or client can be enabled to further restrict access to certain portions of the software components or internal data of a software implementation. In a submarine deployment, for example, certain access privileges can be hidden by the software. Also, a user (manager) can access the various details of the API to add to or remove portions of the restrictions. The software can basically be developed with a certain base access level that is built in. Then, the user can only constrain that access level further, but cannot add extra allowances that are not already part of the original development. The orchestrator can take base APIs that are available to an external user and constrain it further based on any number of factors, such as workflow in which the customer is operating or depending on how the software is used.

The embodiments described herein may be applicable to any type of software deployment. There may be any number of ways in which the access limitations of the API can be adjusted. The API may be adjusted, for example, based on: a) licensing, b) user class, c) environment in which an end user's computing system operates, d) a native model, etc. In some cases, a customer may want a different open model on top of an original model (e.g., OpenConfig), which may be a completely different model. Some clients want this model to be exported. Even though the entire OpenConfig model may not be supported, but perhaps just pieces of it, there may be a constraint that the service may be able to apply on its own. In another example, a user may be in any combination of modes, such as an RLS mode having RLS data and software, an OpenConfig with OpenConfig data and software, or a hybrid mode that includes a mix of multiple modes. In the present disclosure, a system may be able to combine APIs externally from multiple sources or modes.

According to one operation, a customer may take a model (e.g., OpenConfig) and make a copy of it and then add their own modifications for their particular applications. In this case, an orchestrator may recognize that the customer is in the OpenConfig mode, but it is specifically the customer's version of it. The orchestrator may enable pieces of a superset model underneath based on who the customer is, constrained at the service level. On top of that, the user can also apply constraints.

An advantage of these embodiments is that since the software may be data driven, any customer can go in and see what he or she has access to. They can view the full filtered intersection of all of the filters accessible through that external API, which may be the same mechanism that all those services use to know what to report and what to prohibit if someone is trying to do something they do not have access to.

Returning again to FIG. 4, the resource 62 itself refers to what is available from the services 72a, 72b, 72c. In the workflow 64, the user 68 may have accept to other things based on what session 66 the user 68 is logged in to, although the user 68 may be constrained in other ways. The user 68 might have constraints imposed by the system 70, which may have certain restrictions or limitations according to some aspects. Also, Services A, B, and C (i.e., services 72a, 72b, 72c) may represent the actual owners of the resource 62, which is why they are shown in three separate batches. When the restrictions from all the different levels for the resource 62, workflow 64, session 66, user 68, system 70, and services 72a, 72b, 72c are added into a combination, the combined filter 74 shows the intersection of all the various restrictions together, which results in a cohesive version of the resource 62 that each service 72 supports and how the intersection turns into the combined filter 74 shown at the bottom of FIG. 4.

An advantage of the software being implemented as a microservice is its ability, at run time, to combine the resource list as shown in FIG. 4 to provide the combined filter 74. The different services 72a, 72b, 72c are represented in FIG. 4 as the available resources or APIs from a given service. When the levels of each service 72 are combined from an external perspective, they are rolled up together. One purpose of microservices is that the customers do not actually know that microservices exist on the back end. From a deployment perspective, the customers might have their own resources, but, when the features are rolled up, it is possible to combine the features into a superset. This may still be transferred to a user, where further constraints can be added. The user might not have visibility about which microservices are constrained, but may be view the resources and APIs. The system has to be managed with respect to how the constraints are percolated down to the services inside the system.

Figure 5:
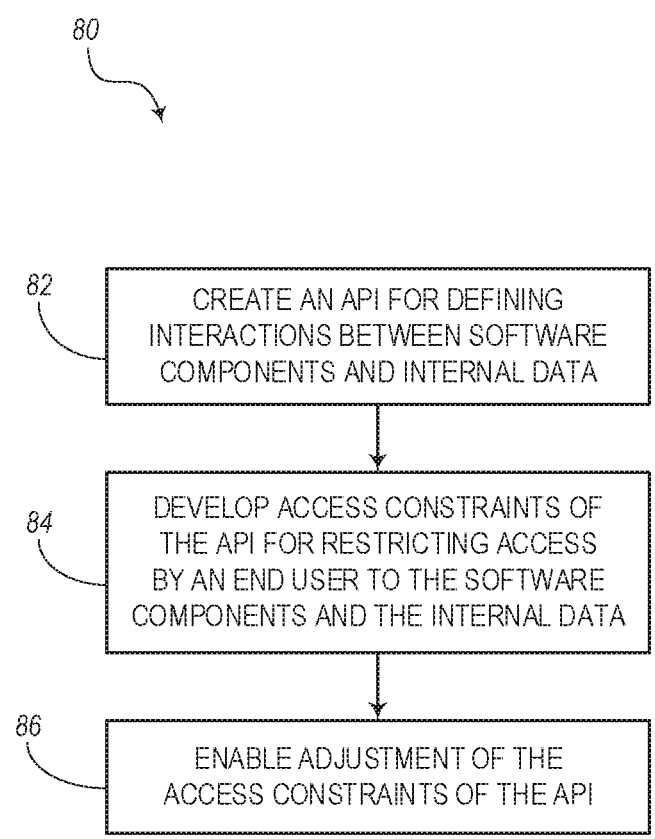
FIG. 5 is a flow diagram illustrating a process for customizing an API, according to various embodiments.

FIG. 5 is a flow diagram illustrating an embodiment of a process 80 for customizing an API. In this embodiment, the process 80 includes creating an API for defining interactions between software components and internal data, as indicated in block 82. The process 80 also includes developing access constraints of the API for restricting access by an end user to the software components and the internal data, as indicated in block 84. Also, the process 80 includes enabling the adjustment of the access constraints of the API, as indicated in block 86.

The process 80 may include the functionality of a computing system and may be executed by a processing device (e.g., processing device 12) running the API customization module 24 stored in the memory device 14. In this respect, the memory device 14 may be configured to store the API and additional computer software (e.g., API customization module 24) having a plurality of software components configured to enable the processing device 12 to utilize internal data for performing a plurality of functions. The API may be configured to define interactions between the software components and may be further configured to define access constraints with respect to the computing system. The access constraints configured to restrict access by an end user (e.g., associated with the computing system) with respect to the internal data and software components. The computer software enables adjustment of the access constraints of the API.

The API may be a northbound service acting as a gateway between the end user and the software. The access constraints of the API may be adjusted based on one or more of: a) a role of the computing system, b) a license agreement, c) one or more standards or protocols, d) an authorization of the end user, e) an access group of the end user, f) deployment parameters, g) a current session, h) workflow, i) equipment provisioning, and j) troubleshooting results. The API may be configured to allow one or more actions of: a) controlling a mode of the computing system, b) controlling other APIs available to the end user or a user class of the end user, c) controlling other APIs available based on purchased or licensed content, d) selecting another API for performing a specific task, e) enabling the end user to selectively constraint the API.

The API may be defined by a schema or model written in a machine parsable language. The access constraints of the API may be defined by a list of Uniform Resource Locators (URLs). The internal data may include access constraints whereby input data has different restrictions than output data. The input data and output data may include information with respect to the end user, uptime, events, and telemetry. The access constraints of the API may be created by merging different filters. The filters may include a base filter and one or more of a set of exclusion filters and a set of inclusion filters.

The software may include functionality to test the internal data for violations of the access constraints and to report errors resulting from testing the internal data. The access constraints of the API may be based on services including one or more of Wi-Fi, Ethernet, Generalized Multi-Protocol Label Switching (GMPLS), Border Gateway Protocol (BGP), Open Shortest Path First (OSPF), Intermediate System to Intermediate System (ISIS), transport, equipment, alarms, security, IPv4, IPv6, and Dynamic Host Configuration Protocol (DHCP). The services may include one of a standard view, limited view, and diagnostic view. The access constraints of the API may be defined by a combination of constraints on multiple levels including at least two of: service, system, deployment, resource, user, session, and workflow.

Therefore, the embodiments of the present disclosure include novel features with respect to conventional systems having fixed API constraints. One novel feature is the ability to dynamically change API specifications based on user provisionable and system definable constraints. The access constraints may be applicable at many levels and may be combined in ways that a framework can generically export, along with support statements to the API, documentation, help text, error reporting and handling, and other data. Therefore, instead of being limited by an API having a statically-defined monolithic definition that only filters based on a user access level, the embodiments of the present disclosure allow dynamic adjustment of API specifications for applicability on multiple levels. Also, the present disclosure provides multiple filters that can be combined for customizing a specific view of the API based on multiple factors not limited only to a simple user access level. Many other use cases are contemplated which should allow multiple elements in the system to define different levels of access control and then allow a framework to merge and overlap these filters in useful ways. Thus, according to the present disclosure, the embodiments may be able to provide filters that can be specified by system level resources, operators, users, sessions, and deployment conditions and allow a framework to impose and expose those filters. This allows for easy ways to satisfy many different use cases related to access control and solves a customer need to allow for packaging time, deployment time, and runtime changes to supported APIs in any system composed of these filterable services.

Although the present disclosure has been illustrated and described herein with reference to exemplary embodiments providing various advantages, it will be readily apparent to those of ordinary skill in the art that other embodiments may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A computing system comprising
a processing device, and
a memory device configured to store an Application Programming Interface (API) and computer software having a plurality of software components configured to enable the processing device to utilize internal data for performing a plurality of functions,
wherein the API is configured to define interactions between the software components and is further configured to define access constraints with respect to the computing system, the access constraints configured to restrict access by an end user associated with the computing system with respect to the internal data and software components,
wherein the computer software is configured to adjust the access constraints of the API at runtime, wherein the access constraints of the API are created by merging a plurality of filters with fields that are any of included and excluded, and wherein the plurality of filters are for any of resources, workflows, sessions, users, and services, and
wherein the computer software includes functionality to test the internal data for violations of the access constraints and to report errors resulting from testing the internal data.

2. The computing system of claim 1, wherein the API comprises a northbound service acting as a gateway between the end user and the computer software.

3. The computing system of claim 1, wherein the access constraints of the API are adjusted based on one or more of: a) a role of the computing system, b) a license agreement, c) one or more standards or protocols, d) an authorization of the end user, e) an access group of the end user, f) deployment parameters, g) a current session, h) workflow, i) equipment provisioning, and j) troubleshooting results.

4. The computing system of claim 1, wherein the API is further configured to allow one or more actions of: a) controlling a mode of the computing system, b) controlling other APIs available to the end user or a user class of the end user, c) controlling other APIs available based on purchased or licensed content, d) selecting another API for performing a specific task, e) enabling the end user to selectively constraint the API.

5. The computing system of claim 1, wherein the API is defined by a schema or model written in a machine parsable language.

6. The computing system of claim 1, wherein the access constraints of the API are defined by a list of Uniform Resource Locators (URLs).

7. The computing system of claim 1, wherein the internal data includes access constraints whereby input data has different restrictions than output data.

8. The computing system of claim 7, wherein the input data and output data include information with respect to the end user, uptime, events, and telemetry.

9. The computing system of claim 1, wherein the access constraints of the API are based on services including one or more of Wi-Fi, Ethernet, Generalized Multi-Protocol Label Switching (GMPLS), Border Gateway Protocol (BGP), Open Shortest Path First (OSPF), Intermediate System to Intermediate System (ISIS), transport, equipment, alarms, security, IPv4, IPv6, and Dynamic Host Configuration Protocol (DHCP).

10. The computing system of claim 9, wherein the services include one of a standard view, limited view, and diagnostic view.

11. The computing system of claim 1, wherein the access constraints of the API are defined by a combination of constraints on multiple levels include at least two of: service, system, deployment, resource, user, session, and workflow.

12. A non-transitory computer-readable medium configured to store computer software having a plurality of software components, the computer software, when executed by a processing device, enables the processing device to utilize internal data for performing a plurality of functions and further enables the processing device to:
configuring to store an Application Programming Interface (API) to enable the processing device to utilize internal data for performing a plurality of functions,
wherein configurated Application Programming Interface (API) for defining interactions defining interactions between the software components and the internal data, develop access constraints of the API for restricting access by an end user to the software components and the internal data,
adjust the access constraints of the API at runtime, wherein the access constraints of the API are created by merging a plurality of filters with fields that are any of included and excluded, and wherein the plurality of filters are for any of resources, workflows, sessions, users, and services, and wherein the computer software includes functionality to test the internal data for violations of the access constraints and to report errors resulting from testing the internal data.

13. The non-transitory computer-readable medium of claim 12, wherein the access constraints of the API are adjusted based on one or more of: a) a role of a computing system associated with the end user, b) a license agreement, c) one or more standards or protocols, d) an authorization of the end user, e) an access group of the end user, f) deployment parameters, g) a current session, h) workflow, i) equipment provisioning, and j) troubleshooting results.

14. The non-transitory computer-readable medium of claim 12, wherein the API is configured to allow one or more actions of: a) controlling a mode of a computing system associated with the end user, b) controlling other APIs available to the end user or a user class of the end user, c) controlling other APIs available based on purchased or licensed content, d) selecting another API for performing a specific task, e) enabling the end user to selectively constraint the API.

15. A method comprising the steps of
configuring to store an Application Programming Interface (API) to enable the processing device to utilize internal data for performing a plurality of functions,
wherein configured Application Programming Interface (API) for defining interactions between software components and internal data,
developing access constraints of the API for restricting access by an end user to the software components and the internal data,
enabling adjustment of the access constraints of the API at runtime, wherein the access constraints of the API are created by merging a plurality of filters with fields that are any of included and excluded, and wherein the plurality of filters are for any of resources, workflows, sessions, users, and services, and
testing the internal data for violations of the access constraints and reporting errors resulting from testing the internal data.

16. The method of claim 15, wherein the access constraints of the API are based on services including one or more of Wi-Fi, Ethernet, Generalized Multi-Protocol Label Switching (GMPLS), Border Gateway Protocol (BGP), Open Shortest Path First (OSPF), Intermediate System to Intermediate System (ISIS), transport, equipment, alarms, security, IPv4, IPv6, and Dynamic Host Configuration Protocol (DHCP), wherein the services include one of a standard view, limited view, and diagnostic view, and wherein the access constraints of the API are defined by a combination of constraints on multiple levels include at least two of: service, system, deployment, resource, user, session, and workflow.

* * * * *